Sept. 26, 1961 D. RICHMAN 3,002,050

GAIN CONTROL OF TRANSMITTER SUBCARRIER CHANNEL FOR MINIMIZING BRIGHTNESS DISTORTION

Filed March 28, 1956 2 Sheets-Sheet 1

United States Patent Office 3,002,050

Patented Sept. 26, 1961

3,002,050

GAIN CONTROL OF TRANSMITTER SUBCARRIER CHANNEL FOR MINIMIZING BRIGHTNESS DISTORTION

Donald Richman, Fresh Meadows, N.Y., assignor to Hazeltine Research, Inc., Chicago, Ill., a corporation of Illinois Filed Mar. 28, 1956, Ser. No. 574,465
6 Claims. (Cl. 178—5.4)

*General*

This invention relates to color-television transmitting systems of the band-width limited gamma-corrected type and, particularly, to apparatus for minimizing the signal distortion caused by such band-width limited gamma-correction operation.

Present color-television standards aim at an ideal in which all of the brightness or luminance information concerning the image is conveyed in a monochrome signal and all the chrominance information in a subcarrier signal. However, because of the square-law nature of the receiver and the form of gamma correction commonly used in present-day practice, a relatively small amount of the luminance information is actually conveyed by the subcarrier signal and to this extent the system may fall short of the desired ideal. In order that all of the transmitted signal components may fit within the allocated band widths with a minimum of interference therebetween, the monochrome signal is selected to be a relatively wide band signal while the subcarrier signal is transmitted as a relatively narrow band signal. In a present practice transmitting system, the limited band widths of the circuits for translating the relatively narrow band nonlinear subcarrier signal produce a loss of some of the brightness signal components which are conveyed by such subcarrier signal and also cause deficiencies in the reproduced image which appear as so-called "dark surrounds" or luminance notches" in areas of the reproduced color image wherein the image undergoes a relatively sharp change in colors.

The phenomenon of luminance notches is known in the art and is considered in several technical papers by various writers a good example of which is an article entitled "Color Television Luminance Detail Rendition" by Gibson and Schroeder, appearing at page 918 of the August 1955 issue of the Proceedings of the I.R.E. In this article, there is proposed a method for minimizing such luminance notches. It is there proposed to minimize such defect by modifying the form of the transmitted monochrome signal. This type of modification, however, has the disadvantage that it tends to adversely affect the black-and-white picture produced on a conventional monochrome receiver. In other words, this type of correction produces a signal which is not compatible with existing monochrome receivers. Accordingly, it would be desirable to have a better method of minimizing the effect of such luminance notches and which, at the same time, is compatible with existing monochrome receivers.

It is an object of the invention, therefore, to provide new and improved color-television transmitting apparatus which serves to improve the quality of the reproduced color image without adversely affecting the image reproduced on monochrome receivers.

It is another object of the invention to provide new and improved color-television transmitting apparatus for minimizing undesired brightness conditions known as luminance notches while transmitting a monochrome signal which is compatible with conventional monochrome receivers.

In accordance with the invention, transmitting apparatus, which is utilized in a color-television transmitting system where color camera apparatus is utilized for developing electrical signals representative of the color image and these signals are used to generate a relatively wide band monochrome signal for primarily conveying brightness information and a relatively narrow band subcarrier signal for primarily conveying coloring information and where some brightness information is conveyed by the subcarrier signal, comprises gamma-correcting apparatus for precorrecting the camera signals in a nonlinear manner to subsequently compensate for the nonlinear transfer characteristic of an image-reproducing device in a receiver, such nonlinear precorrection causing some of the image information to be conveyed by higher frequency harmonic components of the camera signals. Such transmitting apparatus also includes a relatively narrow band subcarrier signal channel responsive to the gamma-corrected camera signals for generating and transmitting the normal subcarrier signal where the limited band width of such channel tends to produce visible image distortions by suppression of subcarrier signal components corresponding to higher frequency harmonic components. The transmitting apparatus further includes circuit means included in the subcarrier signal channel for altering the transient path in the subcarrier plane for higher frequency subcarrier signal transients to minimize the subjective effect of the distortions in the reproduced image.

For a better understanding of the present invention, together with other and further objects thereof, reference is had to the following description taken in connection with the accompanying drawings, and its scope will be pointed out in the appended claims.

Referring to the drawings.

Figure 1:
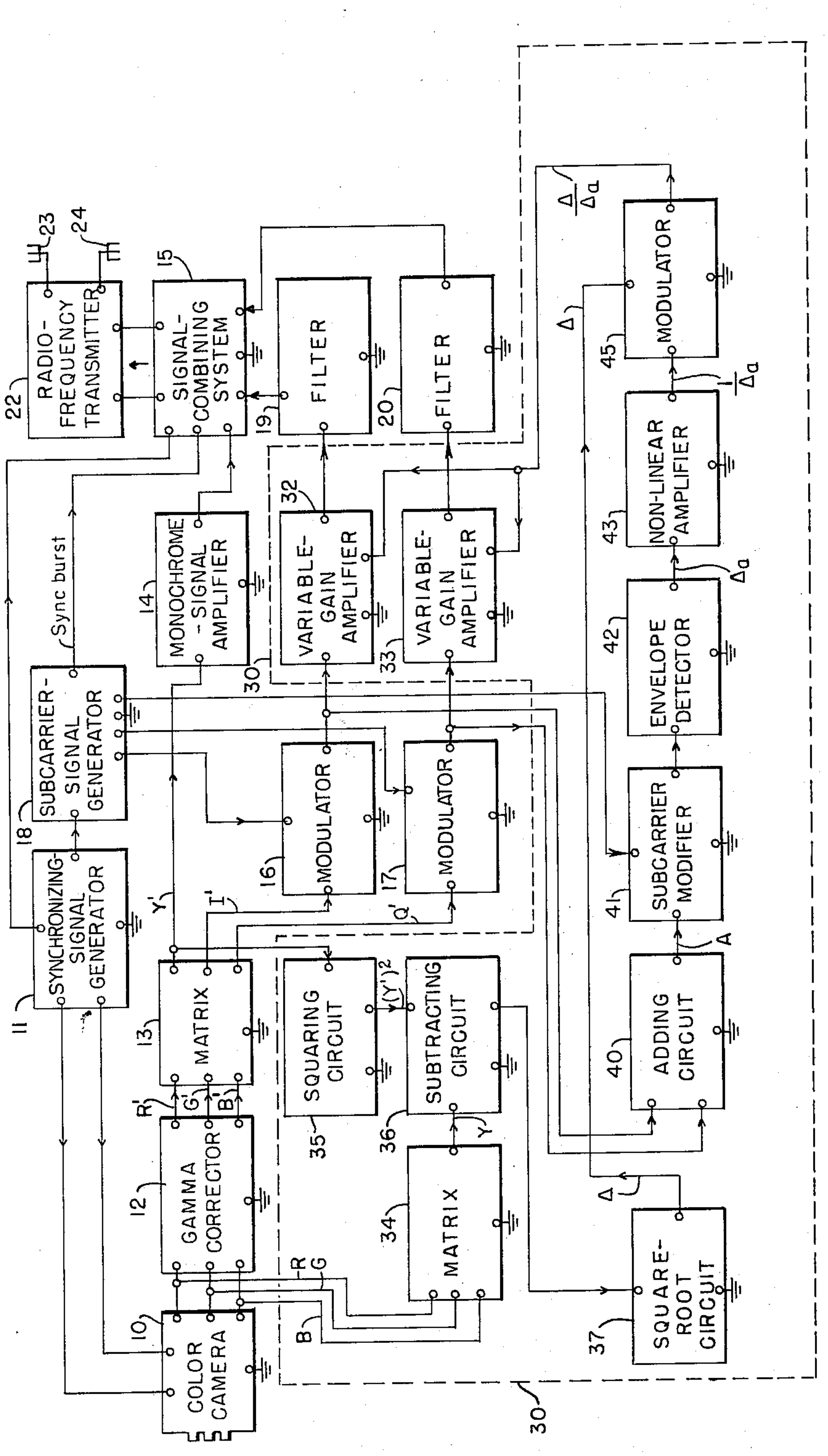
FIG. 1 is a circuit diagram of a complete color-television transmitting system including a representative embodiment of transmitting apparatus constructed in accordance with the present invention.

*Description of FIG. 1 transmitting system*

Referring to FIG. 1 of the drawings, there is shown a representative embodiment of a complete color-television transmitting system. Such system includes a color camera 10 for developing electrical signals representative of the color of the image being televised. In accordance with conventional practice, such electrical signals may be representative of the red, green, and blue color components of the image element being televised. In a conventional manner, the color camera 10 scans the whole image to be televised in a desired scanning pattern so that the color characteristics of each image element are successively ascertained. Proper synchronization of the scanning operation of the color camera 10 is obtained by means of synchronizing signals supplied thereto from the synchronizing-signal generator 11. Such color camera 10 and generator 11 may be of conventional construction.

Figure 3:
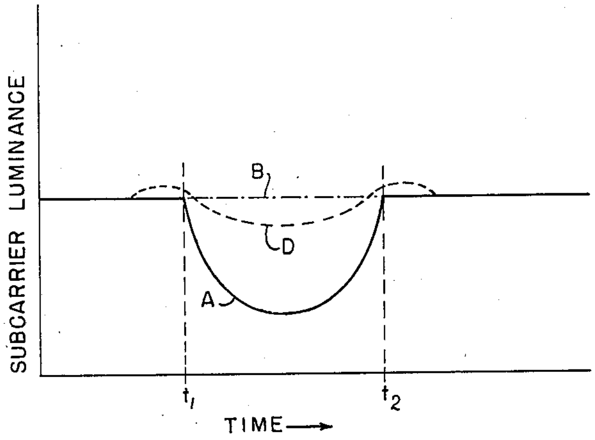
FIG. 3 is a graph used in explaining the operation of the FIG. 1 system.

The color signals developed by the camera 10 are supplied to a gamma corrector 12 wherein each of the color signals is individually modified in a non-linear manner to compensate or precorrect for the non-linear transfer characteristic of the image-reproducing device in a receiver. More particularly, each of the color signals is raised to the $$\frac{1}{\gamma}$$

power where $\gamma$ represents the power factor of the image-reproducing device in the receiver. Such gamma-corrected color signals are then supplied to a matrix 13 which serves to combine these signals in the appropriate proportions to produce a monochrome signal Y′ and a pair of subcarrier signal components I′ and Q′. The monochrome signal Y′ may then be translated by way of a monochrome-signal amplifier 14 to a signal-combining system 15. The matrix 13, monochrome-signal amplifier 14, and signal-combining system 15 may be of conventional construction and operation. For example. matrix 13 may be such as that shown in FIGURE 3 of an article "The Colorplexer—A Device for Multiplexing Color Television Signals in Accordance with the NTSC Signal Specifications," by E. E. Gloystein and A. H. Turner, appearing in the January 1954 issue of the Proceedings of the I.R.E.

The subcarrier signal components I′ and Q′ are supplied to a relatively narrow band subcarrier signal channel which includes the modulators 16 and 17. Also supplied to the modulator 16 is a sinusoidal carrier signal of subcarrier frequency, namely approximately 3.58 megacycles, such signal being developed by the subcarrier signal generator 18. A similar 3.58-megacycle carrier signal is supplied to the modulator 17 but this signal differs from that supplied to the modulator 16 in that its phase has been shifted by 90° relative thereto. In other words, the two 3.58-megacycle subcarrier signals supplied to the modulators 16 and 17 are in phase quadrature with one another. The encoded or modulated subcarrier signal from the modulator 16 is then supplied by way of apparatus 30, indicated within the dashed line box and constructed in accordance with the present invention, to a band-limiting filter 19 which serves to ensure that the subcarrier signal components supplied thereby to the combining system 15 are relatively narrow band in nature. In a similar manner, the encoded Q′ subcarrier signal from the modulator 17 is supplied by way of the apparatus 30 and a band-limiting filter 20 to the signal-combining system 15.

Also supplied to the signal-combining system 15 are suitable line-scan and field-scan synchronization pulses from the synchronizing-signal generator 11 and a suitable color sync burst signal from the generator 18. In a conventional transmitting system, the signal-combining system 15 serves to combine all these signals in a straightforward manner so as to produce a composite video signal which, in turn, is supplied to a radio-frequency transmitter 22 wherein such composite video signal is encoded onto the radio-frequency carrier which, in turn, is radiated by an antenna system 23, 24 towards the receivers. The modulators 16 and 17, the subcarrier signal generator 18, the filters 19 and 20, and the radio-frequency transmitter 22 may be of conventional construction and operation. In particular, modulators 16 and 17 may be such as that shown in FIGURES 8–12, page 179, of the publication "Color Television Practices," J. F. Rider Publisher, Inc., 1955.

The precise pass bands for the filters 19 and 20 depend upon the type of color-television system that is desired. More particularly, for a conventional type of color-television system these filters will have band widths such that a 2.1–3.1 megacycle portion, approximately, of the I′ subcarrier component is transmitted in a single side-band manner while the portions of both the I′ and Q′ subcarrier components lying within about 0.5 megacycle of the 3.58-megacycle subcarrier frequency are transmitted in a double side-band manner. Improved picture resolution may be obtained, however, by utilizing a color-television system as described in copending application Serial No. 567,503 of Donald Richman, entitled "Color-Television System," filed February 24, 1956, now U.S. Patent No. 2,898,397. Where the improved system of the copending application is used, the signal-combining system 15 may be modified to include the additional circuitry required in accordance therewith and the band widths of the filters 19 and 20 may be altered or these filters may be replaced by filters similar in purpose and located elsewhere in the transmitting system. Corresponding considerations apply to the band widths of the other circuits which translate the I′ and Q′ signals, that is, the band widths may be modified where the improved system is used.

Considering now in detail the apparatus within the dashed line box 30, such apparatus constitutes a representative embodiment of circuit means included in the subcarrier signal channel for altering the subcarrier plane path of higher frequency subcarrier signal transients to minimize the subjective effect of distortions in the reproduced image. To this end, the circuit means 30 includes circuit means responsive to signals derived from the camera signals for developing a control signal representative of the relatively small amount of brightness or luminance information which is carried by the subcarrier signal due to the imperfect form of gamma correction applied in forming the monochrome signal and also includes gain-control apparatus, represented by a pair of variable-gain amplifiers 32 and 33, included in the subcarrier signal channel and responsive to the control signal for altering the magnitude of the subcarrier signal in accordance with such brightness information that should be carried by such subcarrier signal. The variable-gain amplifiers 32 and 33 may individually comprise, for example, a multi-electrode electron tube, such as a pentode, having a remote cutoff grid-voltage plate-current characteristic, whereby the subcarrier signal component may be supplied to one of the tube electrodes while the control signal is supplied to another tube electrode to control the gain of the amplifier in accordance therewith. Variable-gain amplifiers 32 and 33 may also take the form of the gain-control circuit shown in FIGURE 2 of an article "Practical Volume Expansion" by C. M. Sinnett appearing in Electronics magazine, November 1935, page 429, and comprising the "variable-gain voltage amplifier" tube 6L7 having a gain-control voltage derived from the detector tube 6C5 and applied to its No. 3 grid and having the signal to be controlled applied to its No. 1 grid. Any other of the well-known types of amplitude modulators may be used in place of the variable-gain amplifiers 32 and 33, such amplifiers only being intended as representative of one way in which the magnitude of the subcarrier signal may be controlled by the control signal.

The circuit means for developing the control signal may include nonlinear matrixing apparatus for matrixing the camera signals that have not been gamma corrected and the generated monochrome signal for developing a first signal representative of the brightness information which should be conveyed by the subcarrier signal. Such nonlinear matrixing apparatus may comprise a matrix 34, a squaring circuit 35, a subtracting circuit 36, and a square-root circuit 37. The matrix 34 may be the same as the luminance matrix portion of the matrix shown in the aforementioned article in the January 1954 issue of the Proceedings of the I.R.E. and is responsive to uncorrected camera signals while the squaring circuit 35 is re-signals derived by these two circuits are combined by the subtracting circuit 36 and modified by the square-root circuit 37 to produce at the output of the square-root circuit 37 the desired first signal representative of the brightness information which should be carried by the subcarrier signal. This group of circuits constitutes nonlinear matrixing apparatus because the squaring and square-root operations are nonlinear in character. Such signal squaring and square-root circuits are widely known in the art and may take, for example, the form of any of the appropriate circuits described on pages 679–691 of a book entitled Waveforms, volume 19, M.I.T. Radiation Laboratory Series, McGraw-Hill, 1949. Briefly speaking, however, such circuits may comprise a pentode-type electron-discharge tube which is operated over a portion of the grid-voltage plate-current characteristic which has the desired nonlinear shape. Such circuits are similar in nature to the nonlinear circuits included within the gamma corrector 12. Subtracting circuit 36 may be such as that shown in FIGURE 8–10 at page 178 of the aforementioned "Color Television Practices" publication.

The circuit means for developing a control signal may further comprise circuit means responsive to the generated subcarrier signal components for developing a second signal representative of the brightness or luminance information actually carried by the subcarrier signal. Such circuit means may comprise an adding circuit 40 for combining the subcarrier signal components to form a composite subcarrier signal which, in turn, is supplied to a subcarrier modifier 41 and envelope detector 42. The adding circuit 40 may be of conventional construction such as that shown schematically in FIGURE 18–12, page 641 of the textbook "Waveforms," M.I.T. Radiation Laboratory Series, McGraw-Hill Book Company, 1949. The envelope detector 42 serves to detect the envelope or amplitude variations of the composite subcarrier. Envelope detector 42 may take the form of the detector assembly in FIGURE 17–31 at page 580 of the textbook "Fundamentals of Television Engineering," McGraw-Hill Book Company, 1955. These envelope variations are representative of the brightness information actually carried by such composite subcarrier signal. It happens, however, that the envelope amplitude for a given amount of subcarrier brightness information is dependent on the instantaneous phase angle of the composite subcarrier signal and differs for different phase angles thereof. It is necessary, therefore, to modify the composite signal so that the same signal amplitude at the output of the detector 42 always corresponds to substantially the same subcarrier brightness information. The subcarrier modifier 41 serves to achieve this modification. Such subcarrier modifier 41 may be of the type described on page 302 of an article entitled "Processing of the NTSC Color Signal for One-Gun Sequential Color Displays" by B. D. Loughlin, appearing in the aforementioned January 1954 issue of the Proceedings of the I.R.E. To this end, a second harmonic reference subcarrier of 7.2 megacycles may be supplied to the modifier 41 by the subcarrier signal generator 18. The signal heterodyning which occurs within the modifier 41 between the input subcarrier signal and the second harmonic reference signal serves to produce additional reversed phase sequence subcarrier components which effectively alter the magnitudes or gains of the I′ and Q′ quadrature components of the composite subcarrier signal so that the brightness information carried by such composite subcarrier signal is independent of the phase angle thereof.

The signal at the output of the detector 42, which is representative of the brightness information actually carried by the subcarrier, is supplied to a nonlinear amplifier 43 which responds thereto to produce an output signal which is representative of the reciprocal of such input signal. Such nonlinear amplifier 43 may comprise, for example, a pentode-type electron-discharge tube which is operated over a portion of the grid-voltage plate-current characteristic which is substantially hyperbolic in shape. Such reciprocal signal is, in turn, supplied to a modulator 45 wherein it is combined or multiplied with the output signal from the square-root circuit 37 which is representative of the brightness information that should be conveyed by the subcarrier signal. Modulator 45 may be of conventional construction and may take the same form as modulator 16. As a result, there appears at the output of the modulator 45 a control signal which is representative of the ratio of correct to actual subcarrier brightness information. This control signal is, in turn, supplied to the variable-gain amplifiers 32 and 33 to control the magnitude of the transmitted subcarrier signal in accordance with the brightness information that should be carried by such signal, thereby to minimize the subjective effect of brightness distortions which would otherwise result in the reproduced image.

As shown in FIG. 1, a pair of variable-gain amplifiers has been used. It will be apparent to those skilled in the art, however, that the subcarrier signal components may first be combined to form a composite subcarrier signal and then only a single variable-gain amplifier utilized to control the magnitude of such composite signal. In this case, such composite subcarrier signal, prior to the magnitude modification thereof, could be supplied directly to the subcarrier modifier 41 thus eliminating the additional adding circuit 40. Other variations will be apparent to those skilled in the art. In this regard, it should be noted that the essence of the invention does not reside in the particular types of circuits used but rather in the functions which the primary groupings of these circuits perform.

*Operation of FIG. 1 transmitting system*

Considering now the operation of the transmitting system and, particularly, the modifications of the present invention, it is first necessary to consider the nature of image distortion that results from the use of a conventional transmitting system. Primarily, the difficulty arises because of the fact that the signals are gamma corrected and then band limited. More particularly, the gamma-correction operation performed by the gamma corrector 12 is a nonlinear operation and, hence, produces higher order harmonics of the signals being corrected. It also modifies the average or direct-current component of luminance. Such higher order or higher frequency harmonics carry useful components of the total image information and, hence, the loss of such harmonics due to the limited band widths of the subsequent circuits represents a loss of image information and, hence, may produce noticeable distortions in the reproduced image.

It has been determined experimentally that the human eye is highly sensitive to high-frequency brightness or luminance variations. Accordingly, it is particularly desirable to consider the losses of such luminance information. As is known in the art, the present practice form of gamma-corrected monochrome signal falls short of the ideal and desired condition that such monochrome signal convey all the luminance information because of the somewhat imperfect form of gamma correction which is applied in forming such monochrome signal. As a result, a small amount of the luminance information is conveyed by the subcarrier signal and, in order that no luminance distortions result in the reproduced color image, such subcarrier luminance information should not be lost. As mentioned, however, the nonlinear operation of the gamma corrector 12 causes some of the subcarrier luminance information to be conveyed by subcarrier signal components which correspond to the higher frequency harmonic components developed by such gamma corrector 12. The relatively narrow band width of the subcarrier signal channel causes a loss of some of these higher harmonic components which, in turn, causes some spurious luminance components to be produced when gamma is restored at the receiver.

Figure 2:
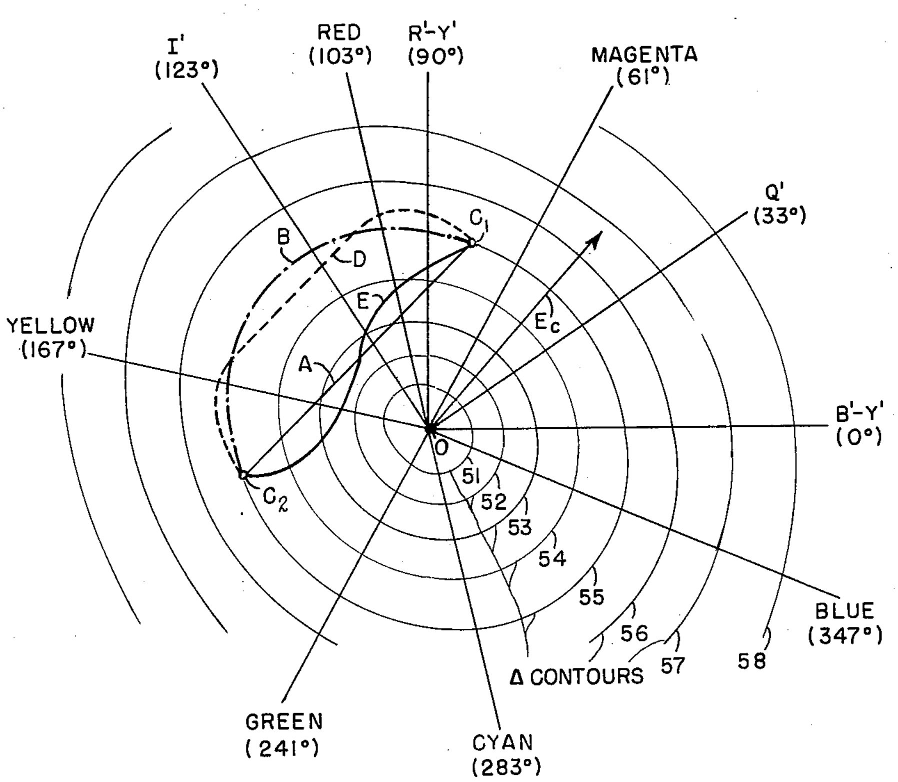
FIG. 2 is a subcarrier plane diagram used in explaining the operation of the FIG. 1 transmitting system.

In order to more readily understand the nature of the loss of subcarrier luminance information, reference is now made to FIG. 2 of the drawings which represents a subcarrier plane diagram of the composite subcarrier signal which is transmitted by the transmitting system. Various representative signal axes are indicated thereon. As mentioned, the composite subcarrier signal is formed by combining the quadrature-phased I′ and Q′ subcarrier components which, as indicated in FIG. 2, lie along the I′ and Q′ signal axes. As these signals represent two vectors at right angles with one another which are varying in amplitude, it is apparent that the vector sum thereof may form a composite signal at any phase angle. In this manner, the composite subcarrier signal represented, for example, by the vector $E_c$ varies in both amplitude and phase. As indicated by the various other axes in the FIG. 2 diagram, the phase angle of the composite subcarrier determines the hue or dominant color of the reproduced image. The amplitude of the composite subcarrier signal determines the saturation of the reproduced image, that is, the amount of white which is mixed with the dominant color. This is because the amount of such white is represented primarily by the monochrome-signal amplitude while the amount of color is represented primarily by the amplitude of the subcarrier signal, in which case the greater the amplitude of the subcarrier signal, the greater the saturation or purity of the reproduced color.

The amount of luminance information carried by the subcarrier signal is represented in the FIG. 2 diagram by the contour lines 51–58, inclusive, the reference numerals increasing in the same order or direction as the amount of subcarrier luminance information increases. As drawn, such contours do not represent equal increments of subcarrier luminance. From these contours it will be seen that the more saturated is the color of the image element being televised, the greater is the amount of luminance information carried by the subcarrier signal. In order to visualize the nature of the loss of subcarrier luminance information the path followed by the composite subcarrier signal during a representative color change, such as a change from a color $C_1$ to a color $C_2$, should be considered. These two colors may be represented by the correspondingly designated points of the subcarrier signal diagram of FIG. 2. Assuming, for sake of example, that the color change should be accompanied by no change in image luminance, then the composite subcarrier signal should traverse the path B indicated in the FIG. 2 diagram. This path follows the subcarrier luminance contour and, hence, represents a constant luminance change. Now, assuming further that the color change $C_1$ and $C_2$ occurs in a relatively short time interval, that is, this color change represents a relatively fast color transient, then the camera signal components corresponding to this change will be relatively high frequency in nature and the higher order harmonics produced by the gamma corrector 12 will be of an even higher frequency. As a result, a substantial amount of the higher harmonic image information will be lost due to the limited band width of the subcarrier signal channel. In particular, higher harmonic components of the subcarrier luminance information will be lost. This loss of harmonic components means that the subcarrier signal will no longer be able to follow the path B of FIG. 2 but, instead, will follow a more direct path A which is not so complex frequency-wise and, hence, does not require the higher order harmonic components. The straight line path A is for the case where both the I′ and Q′ subcarrier signal channels are equal in band width. Also, because the luminance is a nonlinear function of the chrominance components, the average or direct-current value of luminance is also changed in the vicinity of the transition.

That the subcarrier transient follows the path A shown in FIG. 2 means that the $C_1$ to $C_2$ color change will be accompanied by an undesirable variation in the average or direct-current value of the subcarrier luminance. This will be indicated by plotting the various values of subcarrier luminance along the path A on a time scale as has been done in FIG. 3. Thus, as the image color changes from $C_1$ to $C_2$ in the time interval $t_1$–$t_2$, such signal cuts across various ones of the luminance contours 51–58, inclusive, representing different values of subcarrier luminance. The values of subcarrier luminance have been plotted on the vertical scale of the FIG. 3 graph. The desired subcarrier path B has also been plotted on the FIG. 3 graph. From a comparison of curves A and B it will be apparent that there is produced an undesirable luminance variation. Luminance variations of this type have been referred to in the art as "dark surrounds" or "luminance notches."

The purpose of the present invention is to minimize the subjective effect of such undesired luminance variations in the reproduced image, that is, to modify the subcarrier signal so that the resulting distortion will be considerably less noticeable to the human eye. This can be done because the present invention recognizes the heretofore unappreciated fact that the subcarrier luminance can be controlled in a useful manner by controlling the path followed in the subcarrier plane diagram by the subcarrier signal transient. In particular, this can be done by controlling the amplitude or magnitude of the subcarrier signal. In other words, as indicated by the subcarrier luminance contours 51–58, inclusive, of FIG. 2, the amplitude of the subcarrier signal also determines the amount of subcarrier luminance. Thus, for the example previously assumed, where the subcarrier transient traverses the path A when it should follow the path B, then the reproduced luminance can be improved by varying the amplitude of the subcarrier signal so as to make the luminance information carried thereby correspond to the luminance information of the desired path B. Because of the limited band width of the subcarrier signal channel, the ideal result cannot be fully obtained and the actual subcarrier variation will follow a path more nearly represented by path D of FIG. 2. The corresponding luminance variation for this path is indicated by curve D of FIG. 3. This luminance variation represented by curve D will be considerably less noticeable to the human eye because the over-all amplitude thereof has been reduced and the average or direct-current value substantially corrected. With regard to the direct-current value, curve D does not introduce any appreciable direct-current component to the luminance variation because the modified variations are both above and below the desired luminance represented by curve B.

As the modified luminance variation represented by curve D still represents the presence of some luminance distortions but of a different shape from those represented by the luminance notch of curve A, the present invention may be crudely explained by saying, on a signal basis, that what was formerly more visible distortion has been modified to become a less visible type of distortion. In this manner the subjective properties of the human eye are more fully utilized. It should also be noted that the luminance notch distortion is not limited to the case where the camera 10 has developed extremely high-frequency signal components because such notches also occur to some extent where only relatively low-frequency signal components are present at the output of the camera 10. This is because part of such low-frequency information is transferred to high-frequency harmonics thereof by the nonlinear gamma corrector 12. As a result, notches may occur for double side-band subcarrier components as well as for single side-band subcarrier components.

As mentioned, the straight line signal path A used in the above example is for the case where both the I′ and Q′ subcarrier signal channels are equal in band width. For the case where the I′ channel band width is wider than that of the Q′ channel, the corresponding path for relatively rapid color transients would be as indicated by curve E of FIG. 2. The luminance distortion for path E will be generally similar to that indicated for path A and may be corrected by the same technique.

In order to develop a suitable control signal for causing the amplitude of the subcarrier signal to be modified so as to minimize the visibility of any subcarrier luminance error, it is necessary to obtain a measure of such subcarrier luminance error. In order to do this, it is convenient to derive mathematical expressions for both the correct subcarrier luminance and the actual subcarrier luminance. To this end, the total reproduced luminance Y, in the absence of any losses of subcarrier luminance, may be denoted by the following expression:

$$Y=Y_m+Y_{sc} \quad (1)$$

where $Y$=total reproduced luminance (for a given picture element)
$Y_m$=monochrome luminance
$Y_{sc}$=subcarrier luminance This equation expresses the fact that the total luminance is made up of both monochrome-signal luminance and subcarrier signal luminance.

For present purposes, it is convenient to re-express the relationship of Equation 1 in the following terms:

$$Y=(Y')^2+(\Delta)^2 \quad (2)$$

where $Y'$=monochrome signal
$\Delta$=correct luminance component of subcarrier signal This equation includes the assumption that the power-law factor of the image-reproducing device in the receiver is equal to two. This is a fair assumption for present-day image-reproducing devices. By rearranging the terms of Equation 2, an expression for the correct luminance component of the subcarrier signal may be obtained as follows:

$$\Delta=\sqrt{Y-(Y')^2} \quad (3)$$

An electrical signal representative of this correct subcarrier luminance is derived by the nonlinear matrixing apparatus which includes units 34–37 of FIG. 1. More particularly, the total reproduced luminance for a given picture element may be expressed in terms of the red, green, and blue color camera signals as follows:

$$Y=0.59G+0.30R+0.11B \quad (4)$$

This signifies that a monochrome signal without gamma correction would carry all the luminance information. Such a signal may be obtained by matrixing the uncorrected R, G, and B camera signals in the matrix 34.

The actual gamma-corrected monochrome signal Y' is obtained by matrixing the individual gamma-corrected color signals in the matrix 13 and may be expressed by the following relationship:

$$Y'=0.59G'+0.30R'+0.11B' \quad (5)$$

The primes indicate that the R, G, and B color signals have been individually raised to the $$\frac{1}{\gamma}$$

power by the gamma corrector 12. This signal is already present in the conventional transmitting system so all that is necessary is to supply such signal to the squaring circuit 35. The subtracting circuit 36 serves to subtract the two signals supplied thereto, as required by Equation 3, and the square-root circuit 37 performs the required square-root operation. In this manner, the signal denoted by the symbol $\Delta$ at the output of the square-root circuit 37 represents the correct subcarrier luminance. This signal is then supplied to the modulator 45.

In order to determine the subcarrier luminance error, it is also necessary to derive a signal representative of the actual subcarrier luminance. Such signal may be denoted by the symbol $\Delta_a$ and is related to the amplitude of the composite subcarrier signal as indicated by the following expression:

$$\Delta_a \approx kA \quad (6)$$

where $\Delta_a$=actual luminance component of subcarrier signal
$k$=proportionality factor
$A$=amplitude of subcarrier Before the composite subcarrier signal is supplied to the subcarrier modifier 41, the factor $k$ of Equation 6 represents a variable which carries with the phase angle of the composite subcarrier. The subcarrier modifier 41 serves to convert the factor $k$ into a factor of fixed or constant value. As a result, the actual subcarrier luminance $\Delta_a$ is represented by the detected envelope of the subcarrier amplitude variations, which envelope signal appears at the output of the detector 42. As mentioned, the nonlinear amplifier 43 serves to produce a signal representative of the reciprocal of the input signal $\Delta_a$. Such reciprocal signal is then multiplied with the signal $\Delta$ from the square-root circuit 37 to produce the desired control signal which, in turn, is supplied to the variable-gain amplifiers 32 and 33. This control signal represents the ratio of correct to actual subcarrier luminance. The variable-gain amplifiers 32 and 33 are individually effective to multiply the amplitude of the subcarrier signals by the control signal. In other words, the actual luminance component of the control signal cancels the corresponding component of the subcarrier signals and, hence, the amplitude of such subcarrier signals varies only in accordance with the amount of correct luminance information that should be carried by such subcarrier signals.

From the foregoing description of the invention, it will be apparent that transmitting apparatus constructed in accordance therewith serves to improve the subjective quality of the reproduced color image by minimizing the visibility of undesired brightness or luminance variations which tend to accompany changes in image colors. Also, by modifying only the subcarrier signal and transmitting the conventional monochrome signal, the apparatus of the present invention achieves the desired results in a manner so as to transmit a signal which is fully compatible with existing monochrome receivers.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. Transmitting apparatus for use in a color-television transmitting system where color camera apparatus is utilized for developing electrical signals representative of the color image and these signals are used to generate a relatively wide band monochrome signal for primarily conveying brightness information and a relatively narrow band subcarrier signal for primarily conveying coloring information and where some brightness information is conveyed by the subcarrier signal, the transmitting apparatus comprising: gamma-correcting apparatus for precorrecting the camera signals in a nonlinear manner to subsequently compensate for the nonlinear transfer characteristic of an image-reproducing device in a receiver, such nonlinear precorrection causing some of the image information to be conveyed by higher frequency harmonic components of the camera signals; a relatively narrow band subcarrier signal channel responsive to the gamma-corrected camera signals for generating and transmitting the normal subcarrier signal where the limited band width of such channel tends to produce visible image distortions by suppression of subcarrier signal components corresponding to said higher frequency harmonic components; and circuit means included in the subcarrier signal channel for altering the subcarrier plane path of higher frequency subcarrier signal transients to minimize said distortions in the reproduced image.

2. Transmitting apparatus for use in a color-television transmitting system where color camera apparatus is utilized for developing electrical signals representative of the color image and these signals are used to generate a relatively wide band monochrome signal for primarily conveying brightness information and a relatively narrow band subcarrier signal for primarily conveying coloring information and where some brightness information is conveyed by the subcarrier signal, the transmitting apparatus comprising: gamma-correcting apparatus for precorrecting the camera signals in a nonlinear manner to subsequently compensate for the nonlinear transfer characteristic of an image-reproducing device in a receiver, such nonlinear precorrection causing some of the image information to be conveyed by higher frequency harmonic components of the camera signals; a relatively narrow band subcarrier signal channel responsive to the gamma-corrected camera signals for generating and transmitting the normal subcarrier signal where the limited band width of such channel tends to produce visible image distortions by suppression of subcarrier signal components corresponding to said higher frequency harmonic components; and gain-control circuit means included in the subcarrier signal channel for altering the magnitude of the subcarrier signal to minimize said distortions in the reproduced image.

3. Transmitting apparatus for use in a color-television transmitting system where color camera apparatus is utilized for developing electrical signals representative of the color image and these signals are used to generate a relatively wide band monochrome signal for primarily conveying brightness information and a relatively narrow band subcarrier signal for primarily conveying coloring information and where some brightness information is conveyed by the subcarrier signal, the transmitting apparatus comprising: gamma-correcting apparatus for precorrecting the camera signals in a nonlinear manner to subsequently compensate for the nonlinear transfer characteristic of an image-reproducing device in a receiver, such nonlinear precorrection causing some of the image information to be conveyed by higher frequency harmonic components of the camera signals; a relatively narrow band subcarrier signal channel responsive to the gamma-corrected camera signals for generating and transmitting the normal subcarrier signal where the limited band width of such channel tends to produce visible brightness distortions in the reproduced image by suppression of subcarrier signal components corresponding to said higher frequency harmonic components; circuit means responsive to signals derived from the camera signals for developing a control signal representative of the brightness information which should be conveyed by the subcarrier signal; and gain-control apparatus included in the subcarrier signal channel and responsive to said control signal for altering the magnitude of the subcarrier signal in accordance with the brightness information that should be carried by such signal, thereby to minimize said brightness distortions in the reproduced image.

4. Transmitting apparatus for use in a color-television transmitting system where color camera apparatus is utilized for developing electrical signals representative of the color image and these signals are used to generate a relatively wide band monochrome signal for primarily conveying brightness information and a relatively narrow band subcarrier signal for primarily conveying coloring information and where some brightness information is conveyed by the subcarrier signal, the transmitting apparatus comprising: gamma-correcting apparatus for precorrecting the camera signals in a nonlinear manner to subsequently compensate for the nonlinear transfer characteristic of an image-reproducing device in a receiver, such nonlinear precorrection causing some of the image information to be conveyed by higher frequency harmonic components of the camera signals; a relatively narrow band subcarrier signal channel responsive to the gamma-corrected camera signals for generating and transmitting the normal subcarrier signal where the limited band width of such channel tends to produce visible brightness distortions in the reproduced image by suppression of subcarrier signal components corresponding to said higher frequency harmonic components; matrixing apparatus for matrixing signals derived from the camera signals for developing a first signal representative of the brightness information which should be conveyed by the subcarrier signal; circuit means responsive to the generated subcarrier signal components for developing a second signal representative of the brightness information actually carried by the subcarrier signal; and gain-control apparatus included in the subcarrier signal channel and responsive to said first and second signals for altering the magnitude of the subcarrier signal in accordance with the brightness information that should be carried by such signal, thereby to minimize said brightness distortions in the reproduced image.

5. Transmitting apparatus for use in a color-television transmitting system where color camera apparatus is utilized for developing electrical signals representative of the color image and these signals are used to generate a relatively wide band monochrome signal for primarily conveying brightness information and a relatively narrow band subcarrier signal for primarily conveying coloring information and where some brightness information is conveyed by the subcarrier signal, the transmitting apparatus comprising: gamma-correcting apparatus for precorrecting the camera signals in a nonlinear manner to subsequently compensate for the nonlinear transfer characteristic of an image-reproducing device in a receiver, such nonlinear precorrection causing some of the image information to be conveyed by higher frequency harmonic components of the camera signals; a relatively narrow band subcarrier signal channel responsive to the gamma-corrected camera signals for generating and transmitting the normal subcarrier signal where the limited band width of such channel tends to produce visible brightness distortions in the reproduced image by suppression of subcarrier signal components corresponding to said higher frequency harmonic components; nonlinear matrixing apparatus for matrixing the uncorrected camera signals and the generated monochrome signal for developing a first signal representative of the brightness information which should be conveyed by the subcarrier signal; circuit means including an envelope detector responsive to the generated subcarrier signal components for developing a second signal representative of the brightness information actually carried by the subcarrier signal; circuit means for combining said first and second signals to produce a control signal; and gain-control apparatus included in the subcarrier signal channel and responsive to said control signal for altering the magnitude of the subcarrier signal in accordance with the brightness information that should be carried by such signal, thereby to minimize said brightness distortions in the reproduced image.

6. Transmitting apparatus for use in a color-television transmitting system where color camera apparatus is utilized for developing electrical signals representative of the color image and these signals are used to generate a relatively wide band monochrome signal for primarily conveying brightness information and a relatively narrow band subcarrier signal for primarily conveying coloring information and where some brightness information is conveyed by the subcarrier signal, the transmitting apparatus comprising: matrixing apparatus for matrixing signals derived from the camera signals for developing a first signal representative of the brightness information which should be conveyed by the subcarrier signal; circuit means responsive to the generated subcarrier signal components for developing a second signal representative of the brightness information actually carried by the subcarrier signal; and gain-control apparatus included in the subcarrier signal channel and responsive to said first and second signals for altering the magnitude of the subcarrier signal in accordance with the brightness information that should be carried thereby.

(References on following page)

References Cited in the file of this patent

UNITED STATES PATENTS

| | | |
|---|---|---|
| 2,779,817 | Stahl | Jan. 29, 1957 |
| 2,789,157 | Borkan | Apr. 16, 1957 |
| 2,793,246 | Olive | May 21, 1957 |
| 2,803,697 | Gibson | Aug. 20, 1957 |
| 2,916,544 | Gibson et al. | Dec. 8, 1959 |

OTHER REFERENCES

"Color Television Luminance Detail Rendition," by Gibson and Schroeder, page 918, August 1955; Proceedings of the I.R.E.